(12) United States Patent
Granados Pelaez et al.

(10) Patent No.: US 9,593,493 B2
(45) Date of Patent: Mar. 14, 2017

(54) MULTILAYER LINING PLATE FOR HORIZONTAL SUPPORT SURFACES AND METHOD OF MANUFACTURING SAME

(71) Applicant: EURO TRADE FLOORING, S.L., Sant Esteve Ses Rovires (ES)

(72) Inventors: David Granados Pelaez, Barcelona (ES); Luis Fernandez Lopez, Barcelona (ES)

(73) Assignee: EURO TRADE FLOORING, S.L., Sant Esteve Ses Rovires (ES)

( * ) Notice: Subject to any disclaimer, the term of this patent is extended or adjusted under 35 U.S.C. 154(b) by 164 days.

(21) Appl. No.: 14/493,668

(22) Filed: Sep. 23, 2014

(65) Prior Publication Data
US 2015/0337545 A1  Nov. 26, 2015

(30) Foreign Application Priority Data
May 20, 2014  (ES) .................................. 201430727

(51) Int. Cl.
| | |
|---|---|
| *E04F 15/10* | (2006.01) |
| *B32B 37/12* | (2006.01) |
| *E04F 15/02* | (2006.01) |

(52) U.S. Cl.
CPC ............ *E04F 15/105* (2013.01); *B32B 37/12* (2013.01); *E04F 15/02038* (2013.01); *E04F 15/107* (2013.01); *B32B 2471/00* (2013.01); *E04F 2201/048* (2013.01); *E04F 2203/08* (2013.01); *Y10T 156/1052* (2015.01); *Y10T 428/192* (2015.01); *Y10T 428/24802* (2015.01)

(58) Field of Classification Search
CPC ....................................................... E04F 15/10

USPC ........................................................... 428/56
See application file for complete search history.

(56) References Cited

FOREIGN PATENT DOCUMENTS

| | | | | |
|---|---|---|---|---|
| DE | 7438712 U | * | 3/1975 | ............ E04F 15/022 |
| DE | 10163435 C1 | | 2/2003 | |
| DE | 102012000468 A1 | | 7/2013 | |
| EP | 2586929 A1 | | 5/2013 | |
| WO | 2011153916 A1 | | 12/2011 | |
| WO | 2012139510 A1 | | 10/2012 | |
| WO | 2012155794 A2 | | 11/2012 | |

OTHER PUBLICATIONS

European Search Report dated Nov. 23, 2015 from the European Patent Office in counterpart application No. 15382260.
Search report dated Jun. 29, 2015, issued by the Spanish Office of Patents in corresponding Spanish Application No. 201430727.

* cited by examiner

*Primary Examiner* — Brent O'Hern
(74) *Attorney, Agent, or Firm* — Sughrue Mion, PLLC

(57) ABSTRACT

The invention relates to a multilayer lining plate (100) for essentially horizontal support surfaces such as floors or floor coverings, comprising a main layer (1), including at least one part made of a rigid or semi-rigid material, and a ductile or flexible upper decorative layer (2). The lining plate comprises in the perimeter of the main layer (1) a ductile machinable portion (3) that can be machined to form a connecting profile for the connection of the plate with other plates. The machinable portion (3) is preferably made of medium-density fiberboard (MDF), a wood-plastic composite (WPC) material or polyvinyl chloride (PVC), and the main layer is of magnesium oxide, fibrocement or mortar with perlite and vermiculite.

18 Claims, 6 Drawing Sheets

MULTILAYER LINING PLATE FOR HORIZONTAL SUPPORT SURFACES AND METHOD OF MANUFACTURING SAME

TECHNICAL FIELD OF THE INVENTION

The present invention relates to a multilayer lining plate for lining essentially horizontal support surfaces such as floors or floor coverings. The surfaces to be lined can be formed by more or less even floors with a concrete or cement finish; said floors can also have smooth or rough finishes or can even be existing floors that already include a previously installed lining, such as tiled floors, for example.

The lining plate comprises a main layer with at least one part made of a rigid or semi-rigid material and a ductile or flexible upper decorative layer, for example, a sheet of vinyl material.

According to another aspect, the invention also relates to a method of manufacturing the lining plate.

BACKGROUND OF THE INVENTION

Vinyl floors or floor coverings, the composition of which is particularly based on a polyvinyl chloride (PVC) lining, are well-known today as replacements for linoleum coverings due to their impermeability, resistance to abrasion, and chemical agents, as well as their non-slip and easy-to-clean properties. Therefore, such lining is extremely suitable for high-traffic areas that require frequent cleaning, such as kitchen, bathroom or children's playroom floors.

In addition to being characterized by their composition, vinyl linings are characterized by being provided with a decorative layer imitating typical linings ranging from those that look like wood, granite or ceramic, to others having more cutting-edge designs that can be obtained by printing any design with different drawings, patterns and colors.

These vinyl linings are found on the market mainly in two formats, i.e., in the form of tiles or boards and in the form of continuous rolls. Linings in tile format are more useful if a part experiences any deterioration because it is only necessary to replace the tile in question and not the entire sheet of the roll.

With respect to placement, vinyl linings in the form of a tile require the application of a dispersion adhesive, gum or glue on the surface to be placed in contact with the floor, although for some time now tiles sold on the market have a self-adhesive layer protected by a sheet of paper that can be peeled off for direct application on the surface of the floor covering or floor to be covered. Vinyl tiles with a perimetral anchoring system for being installed directly on a subfloor can also be found on the market. Such tiles can be installed in a floating manner, i.e., simply connecting the parts to one another without having to adhere them to the surface.

It must be pointed out that vinyl linings have the drawback of having very poor dimensional stability because heat and temperature changes greatly affect them. Therefore, in adverse conditions of heat exposure, a vinyl tile will experience an expansion effect of up to 0.15% with respect to its initial size at room temperature of ±23° C. It can also bow and deform, losing its initial planimetry and therefore becoming detached from its support, or it can become disconnected from adjacent parts in the case of a floating installation. Vinyl linings are therefore unsuitable for floor coverings in installations where there are marked temperature changes (≥15° C.). Cold temperatures also significantly affect the dimensional stability of vinyl, being able to experience a shrinkage effect of more than 0.2% with respect to its initial size at room temperature of ±23° C. Generally, any installation having vinyl floors, particularly those installed in a floating system, must remain at a constant temperature of between 15° C. and 25° C.

To prevent stability problems caused by heat, there are mixed or composite vinyl linings in which the vinyl material is attached directly to a rigid or semi-rigid main layer or substrate having a certain constant thickness, such as cement or fiberglass-reinforced cement, known as fibrocement, thus forming a multilayer lining plate. Fibrocement has an excellent dimensional stability that remains unchanged in response to humidity or temperature changes, and the dimensional stability of fibrocement is ten times higher than the stability of vinyl material.

Nevertheless, the introduction of rigid or semi-rigid materials in the multilayer panel complicates and even prevents being able to actually connect the panels to one another since it is impossible to make any type of male-female groove on the edges of the panels without breaking a portion of the panel. Therefore, the panels either have no grooves and are arranged independently from one another, without acting as a uniform whole, or a groove must be molded together with the fibrocement layer, which makes the lining panel manufacturing process more expensive and longer since it is necessary to arrange molds for the grooves and to manufacture the main layer of the panel by pouring the fibrocement and waiting for it to set, without being able to use prefabricated fibrocement plates for that purpose.

Another added drawback of such multilayer plates is that the rigid or semi-rigid main fibrocement layer has caused difficulties in placing the multilayer lining plate on floors since ductility of the vinyl tile has been lost due to the attachment thereof to the rigid fibrocement layer.

Therefore, vinyl tiles could be easily applied on floor coverings or floors even though their finish is not completely smooth since vinyl is a ductile material that adapts to the imperfections or irregularities that the surface to be lined may have. Nevertheless, by having attached the fibrocement support layer, the resulting panel can hardly adapt to said irregularities and produces a "smacking" effect, a type of noise and certain vertical movement that occur when walking on the panel since the plate is usually only supported by three of its four corners, and upon stepping on the other corner, the plate moves as if it were a lever.

This effect means that floor coverings or floors should not be lined with mixed vinyl and fibrocement plates if they are not completely level and if they have no type of irregularity, which is very hard to find.

Leveling a floor and making sure that its surface is smooth and completely planar involves work and considerable implementation time that is hard to take on, counteracting the placement advantages linked to a vinyl material. Furthermore, in most cases in which the vinyl lining projects from a pre-existing, generally tiled, floor, it is common to find some edges or corners of tiles protruding with respect to adjacent tiles, whereby the lining with a mixed vinyl and fibrocement plate such as those described would only further increase the effect of irregularities due the difference in level, causing a disastrous result from both the aesthetic viewpoint and the personal safety viewpoint.

Based on the foregoing, it would be desirable to have a multilayer lining plate that is dimensionally stable under temperature and humidity conditions, that can be connected with adjacent plates so that the lining acts as a whole, and that is optionally capable of adapting to horizontal surfaces even though these surfaces do not have a perfectly horizontal and smooth finish free of irregularities.

DISCLOSURE OF THE INVENTION

In order to provide a solution to the drawbacks that have been considered, the present invention discloses a multilayer lining plate for essentially horizontal support surfaces such as floors or floor coverings. It must be pointed out that an essentially horizontal support surface is understood as all those surfaces in contrast to vertical surfaces, such as wall surfaces, so they also include surfaces having a certain inclination, such as ramp surfaces.

The multilayer lining plate object of the invention comprises a main layer, including at least one part made of a rigid or semi-rigid material, and a ductile or flexible upper decorative layer.

The multilayer lining plate object of the invention is essentially characterized in that it comprises in the perimeter of the main layer a ductile machinable portion that can be machined to form a connecting profile for connecting the plate with other plates.

According to a feature of the invention, the machinable portion is made of medium-density fiberboard (MDF), a wood-plastic composite (WPC) material or polyvinyl chloride (PVC).

According to another feature of the invention, the decorative layer is a layer of natural or synthetic plant-based material, mineral-based material, organic material, inorganic material or a mixture thereof, although according to a preferred embodiment, it is a sheet of vinyl material having a thickness comprised between 1 and 10 mm.

According to another feature of the invention, the part or parts of the main layer are made of magnesium oxide, fibrocement, also referred to as natural or synthetic fiber-reinforced cement, or mortar with perlite and vermiculite, and the thickness thereof measured in the normal direction with respect to the surface of the decorative layer is equal to or greater than 2.5 mm. In addition to providing strength to the plate, these materials have high dimensional stability since they absorb water or humidity without swelling or changing their dimensions.

According to a first embodiment of the invention, the main layer is configured by a plurality of individual parts arranged adjacent to and facing one another by at least one of their side faces. The individual parts can be rectangular prismatic parts having planar and vertical side sides, and they can be separated from one another leaving a small empty space or a strip of a compressible or spongy material can be arranged in said space.

According to a second embodiment, the individual parts of the main layer can have another configuration in which each part comprises a planar upper face and a planar lower face parallel to one another, and at least one planar side face inclined with respect to the lower face with which it forms an obtuse angle, the individual parts being arranged side by side with their side faces facing one another, such that between the inclined side face or faces of one part and the facing inclined side face or faces of the parts adjacent to said part there is a larger gap between their lower edges than between their upper edges. This configuration and arrangement mean that even though the main layer is rigid or semi-rigid, it can adapt to the irregularities of the support surface because since the main layer is formed by a plurality of individual parts with inclined side faces, the main layer can bend, adapting to the support surface, while at the same time the decorative layer adapts by bowing or bending. The inclination of the side faces is what makes the angular space between support parts possible so that they can rotate specific degrees of inclination with respect to one another. Therefore, the support layer is always completely supported on the support surface and there is no possibility of the instability effect.

Continuing with this configuration, the individual parts can be prismatic parts having a quadrangular base or inverted truncated pyramid-shaped parts. In prismatic parts having a quadrangular base, each part comprises two rectangular side faces, two trapezium-shaped side faces, a rectangular upper face and a rectangular lower face having a surface smaller than the upper face, and such parts are particularly indicated for covering support surfaces having irregularities only in one direction, for example, parallel linear slits. In contrast, inverted truncated pyramid-shaped parts in which the surface of the lower face is smaller than that of the upper face are more suitable with irregularities in any direction. Therefore, the main layer formed by several individual parts supported on the horizontal surface of the floor or floor covering to be covered adapts to any irregularity that the floor or floor covering may have, since it allows bending the rigid or semi-rigid main layer in several directions, the axis of rotation or axis of inclination of an individual part with respect to another adjacent support part being defined by each of the sides of the upper face of the individual part in question. The obtuse angle formed by each of the inclined side faces of an individual part with respect to its lower face is preferably comprised between 92° and 96°.

According to another feature of the invention, the multilayer lining plate can further comprise, arranged below the main layer, a continuous and flexible support layer, preferably of polyvinyl chloride (PVC), a wood-plastic composite (WPC) material or high-pressure laminate (HPL), in this case only when the main layer is manufactured by a single part made of a rigid or semi-rigid material. The support layer provides certain flexibility to the multilayer assembly while at the same time reinforces the lower portion of the plate, which is quite necessary in those plates in which the machined connecting profiles in the ductile machinable portion usually have a very small thickness in the lower portion thereof. The support layer preferably has a thickness equal to or greater than 0.25 mm and less than or equal to 5 mm. Particularly when the support layer is of PVC or HPL, the thickness is usually comprised between 0.3 and 1.5 mm, whereas with WPC the thickness is usually equal to or greater than 3 mm.

According to another feature of the invention, in the lining plate the outer face of the machinable portion oriented opposite the main layer is formed as a connecting profile for the connection with other plates, which results from having machined the mentioned profile in the machinable portion provided for such purpose.

According to another aspect of the invention, a method for manufacturing a multilayer lining plate for essentially horizontal support surfaces such as floors or floor coverings described above is disclosed.

The method is characterized in that it comprises the following steps:

a) arranging a stratum of rectangular-shaped flexible material b) applying glue or an adhesive to the upper face of the stratum of flexible material, c) arranging on the surface with glue or adhesive several strips of a ductile machinable material, covering the four sides of the perimetral area of the surface with the strips and furthermore placing one or more additional strips parallel to the longest side of the stratum of flexible material and separated from one another or from the strips of the perimetral area parallel to the longest side by a certain distance, d) placing one or several plates made of a rigid or semi-rigid material having the same thickness as the strips such that they take up each of the spaces existing between every two adjacent and parallel strips, e) arranging a stratum of ductile or flexible material decorated on one face and applying glue or adhesive on the face opposite the decorated face, f) placing the face with glue or adhesive of the stratum of ductile or flexible material on the arrangement of strips and plates of step d), forming an assembly, and g) dividing the assembly into several plates by making cuts parallel to the longest side vertically coinciding with the longitudinal axis of the additional strips of step c).

According to a feature of the method in step c), in addition to the strips of the perimetral area and the additional strips, one or more strips are placed parallel to the shortest side of the stratum of flexible material and separated from one another by a certain distance, and in step g) cuts parallel to the shortest side of the stratum vertically coinciding with the longitudinal axis of the strips parallel to the shortest side of the stratum are furthermore made. Therefore, after step g) one or more sides of the perimeter of the plate formed by the strips can be machined to form a connecting profile for the connection with other plates.

According to another feature of the method, the stratum of flexible material of step a) is of polyvinyl chloride (PVC), a wood-plastic composite (WPC) material or high-pressure laminate (HPL), whereas the strips that are placed in step c) are made of medium-density fiberboard (MDF), a wood-plastic composite (WPC) material or polyvinyl chloride (PVC).

BRIEF DESCRIPTION OF THE DRAWINGS

The attached drawings illustrate embodiments of the multilayer lining plate object of the invention and several phases of the method of manufacturing same by way of non-limiting example. In said drawings.

DETAILED DESCRIPTION OF THE DRAWINGS

Figure 1:
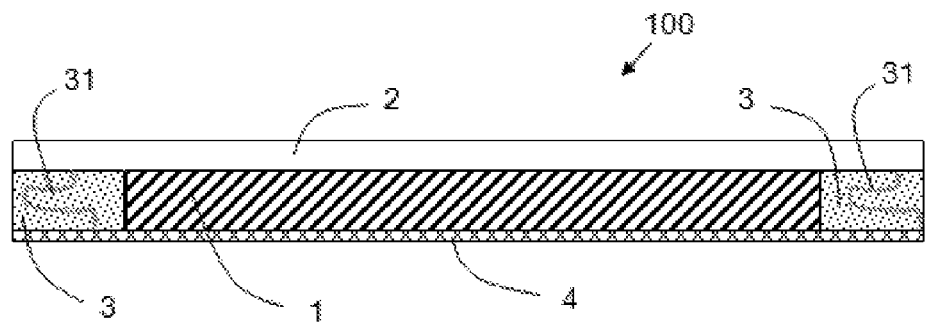
FIGS. 1 to 4 show respective cross-section views according to a vertical longitudinal section plane of four embodiments of the multilayer lining plate object of the invention.

FIGS. 1 to 4 show four variants of a multilayer lining plate 100 for essentially horizontal support surfaces such as floors 6 or floor coverings, comprising at least one main layer 1 of rigid or semi-rigid material and a ductile or flexible upper decorative layer 2. It can be seen that each plate 100 comprises in the perimeter of the main layer 1 a ductile machinable portion 3 that can be machined to form a connecting profile 31 for the connection of the plate with other plates, an example of a connecting profile 31 that can be machined in the machinable portion 3 being depicted with a gray line. FIGS. 5 to 8 show the sections of said plates 100 according to a horizontal section plane at the height of the main layer 1.

As also seen in FIGS. 5 to 8, the machinable portion 3 perimetrically surrounds the main layer 1 and is made of medium-density fiberboard (MDF), a wood-plastic composite (WPC) material or polyvinyl chloride (PVC). These materials allow subsequent machining so that the user or supplier of the plate 100 can machine a male-female type groove according to the chosen shape of the connecting profile 31, therefore resulting in a very versatile plate. In principle, the plate 100 is therefore not limited to any specific design for the connecting profile 31, since it provides the possibility of forming the side edges of the plate with the profile deemed most appropriate by each user or supplier. The materials described for the machinable portion 3 allow forming a connecting profile 31 without problems since they do not break and they allow reproducing any shape, regardless of how narrow some segments of the profile may be. As an example, it has been found that the arrangement of a machinable portion having a width of about 3 or 4 cm is enough to form most connecting profiles 31.

The decorative layer 2 is a ductile or flexible layer, i.e., it allows slight bending, for example, for adapting to certain irregularities of the floor 6 if required. It can be a layer of natural or synthetic plant-based material, mineral-based material, organic material, inorganic material or a mixture thereof, although it is preferably a sheet of vinyl material having a thickness comprised between 1 and 10 mm. The thickness of the decorative layer 2 is preferably comprised between 1.5 and 3 mm, being 2 mm, for example. As a guideline, the vinyl material of the decorative layer 2 has a mean coefficient of thermal expansion of 0.95 mm/m° C. and a mean coefficient of thermal shrinkage of 0.12 mm/m° C., according to laboratory tests conducted by applying maximum temperatures of 50° C. and minimum temperatures of 5° C., starting from 25° C.

Depending on the type of decorative layer 2, said layer 2 can incorporate an outer covering (not depicted) to protect it against wear or external elements. In addition to being resistant, said outer covering must be made of a material that allows correctly viewing the decorative layer 2 it covers. As an example, the material of this outer covering can be transparent and highly resistant polyurethane.

With respect to the main layer 1, said layer 1 is formed by a single part (FIGS. 1 and 5) or several individual parts 10, and the rigid or semi-rigid material is preferably magnesium oxide, fibrocement (fiber-reinforced cement hereinafter referred to as fibrocement) or mortar with perlite and vermiculite. These materials have an excellent behavior with respect to temperature changes and in humid environments because although they can absorb water, they do not swell, i.e., they are dimensionally very stable, while at the same time they give the panel the strength necessary for supporting the weight and mechanical requirements that are typical of a lining for a horizontal support surface such as a floor 6 or floor covering. The main layer 1 preferably has a thickness measured in the normal direction with respect to the surface of the decorative layer 2 equal to or greater than 2.5 mm. For example, when the main layer 1 is of magnesium oxide or fibrocement, it preferably has a thickness of about 4 mm. In fact, when the main layer 1 is formed by a single part (FIG. 1), the thickness is usually between 3 and 4 mm. In contrast, when it is formed by several individual parts 10, the main layer 1 can exceed 4 mm in thickness because dividing it into individual parts 10 confers certain flexibility to the layer and adaptation of the plate 100 to the horizontal surface. As a guideline, both fibrocement and magnesium oxide which can be the material of the main layer 1 have a mean coefficient of thermal expansion of 0.035 mm/m° C. and a mean coefficient of thermal shrinkage of 0.035 mm/m° C., according to laboratory tests conducted by applying maximum temperatures of 50° C. and minimum temperatures of 5° C., starting from 25° C.

On the other hand, it must be taken into account that the thickness of the machinable portion 3 can be equal to, less than or greater than the thickness of the main layer 1 which it perimetrically surrounds.

In the plates 100 of FIGS. 2-3 and 6-7, it is observed that the main layer 1 is formed by four rectangular prismatic individual parts 10 arranged adjacent to and facing one another by at least one of their side faces. In the plate 100 of FIGS. 2 and 6, it can be seen that the individual parts 10 are separated from one another by an empty space, whereas in the plate 100 of FIGS. 3 and 7, there is a strip of compressible or spongy material 5 between one individual part 10 and the next. The individual parts 10 allow adapting to small irregularities of the floor 6, and since they are adhered on the upper portion to the ductile and flexible decorative layer 2, it is possible for the individual parts 10 to move, for example, inclining slightly, with respect to one another according to said irregularities, said movement being translated into the compression or expansion of the spongy material 5.

Figure 2:
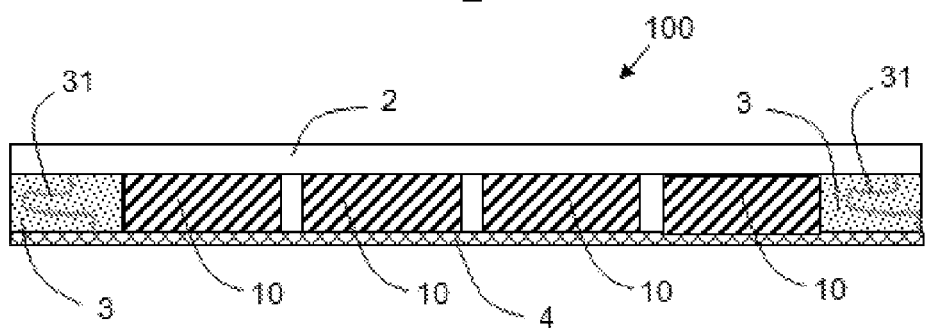
Figure 3:
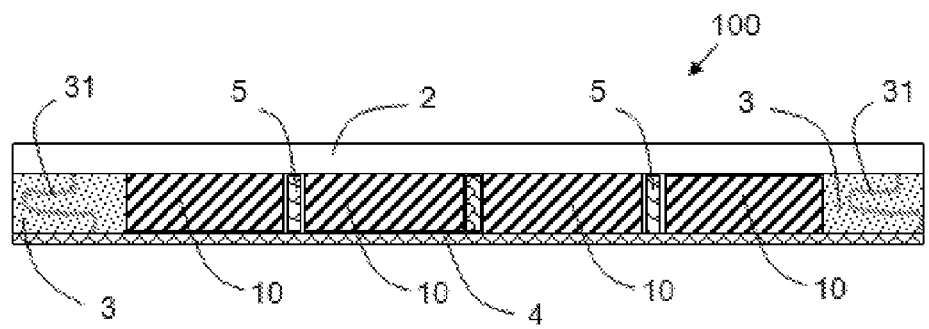

It must also be pointed out that, as seen in FIGS. 1 to 3, the plate 100 comprises a continuous and flexible support layer 4 attached below the main layer 1 and the machinable portions 3. The materials forming the support layer 4 preferably include polyvinyl chloride (PVC), a wood-plastic composite (WPC) material, and high-pressure laminate (HPL). The support layer 4 is preferably of PVC or WPC, since they are waterproof materials. Particularly, the support layer 4 can only be of HPL if the main layer 1 is formed by a single part, such as the plate 100 of FIGS. 1 and 5. The thickness of the support layer 4 is less than or equal to 5 mm, although preferably when it is a layer of PVC or of HPL, the thickness is between 0.3 and 1.5 mm, and when it is a layer of a WPC, the thickness can be equal to or greater than 3 mm.

Figure 4:
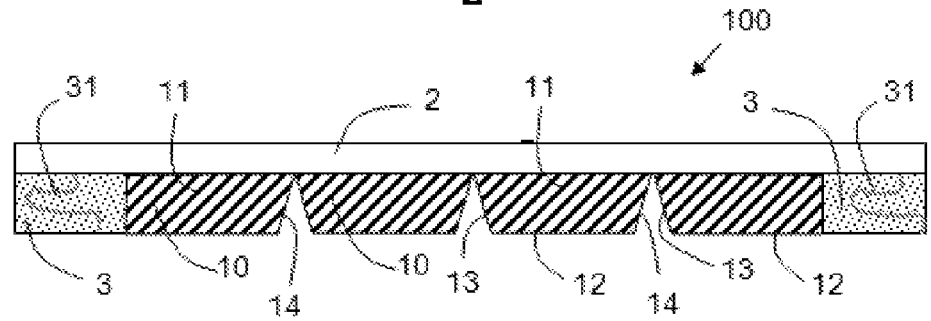
Figure 5:
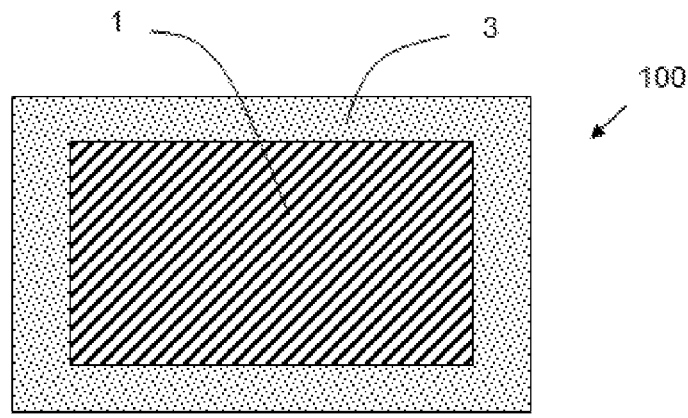
FIGS. 5 to 8 show respective cross-section views according to a longitudinal section plane of the four embodiments of FIGS. 1 to 4.
Figure 6:
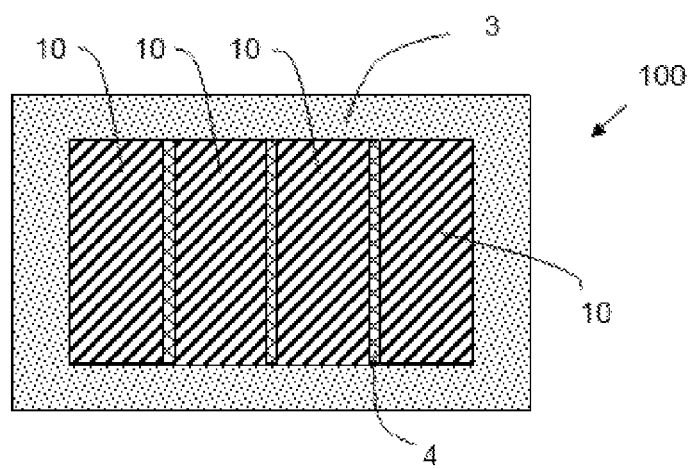
Figure 7:
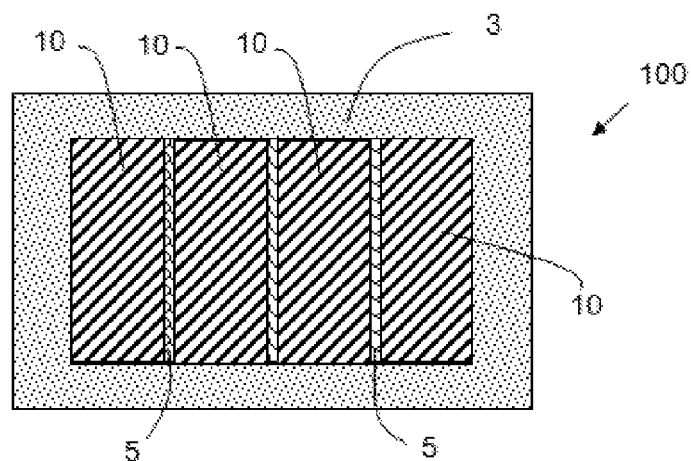
Figure 8:
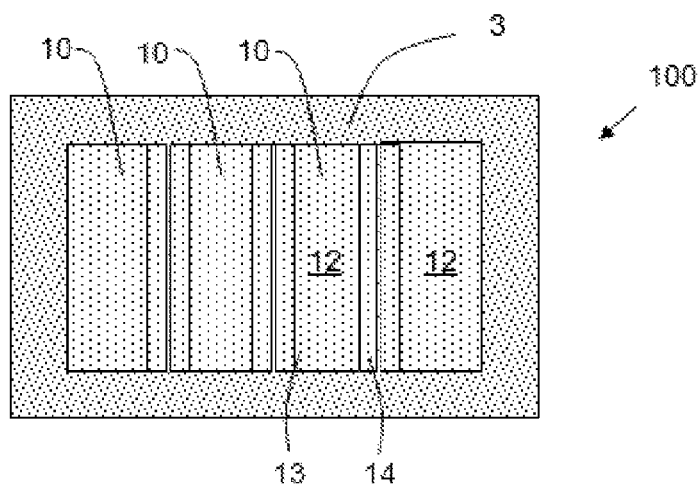
Figure 9:
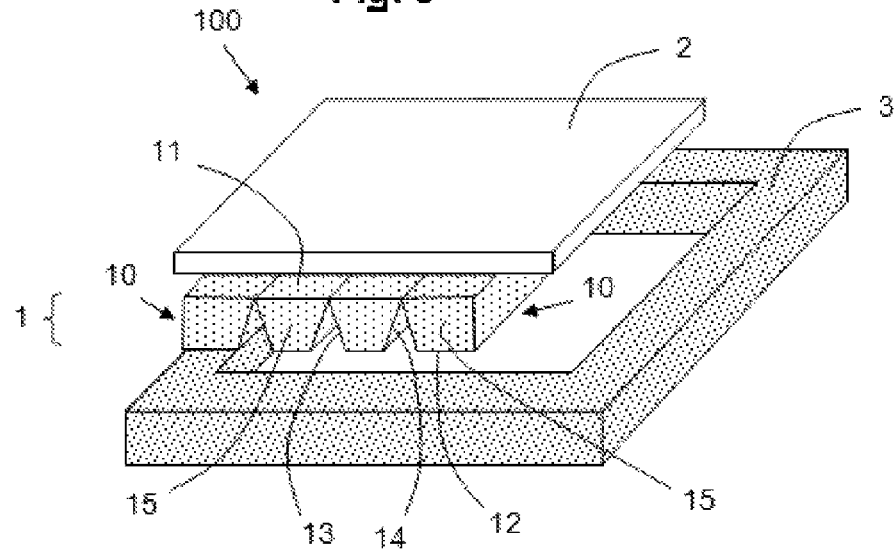
FIG. 9 shows an exploded perspective view of the lining plate of FIG. 8.

When the horizontal surface to be lined has marked irregularities (see the floor 6 in FIG. 10), the plate 100 depicted in FIGS. 4, 8 and 9 is a good solution for covering and adapting to said irregularities, minimizing the stepping instability problems such floors 6 present when walking on the lining covering them.

The plate 100 of FIGS. 4, 8 and 9 is formed by several individual parts 10 in which each individual part comprises a planar upper face 11 and a planar lower face 12 parallel to one another, and at least one planar side face 13, 14 inclined with respect to the lower face 12 with which it forms an obtuse angle. As seen, the individual parts 10 are arranged side by side with their side faces 13, 14 facing one another, such that between the inclined side face or faces 13, 14 of one part 10 and the facing inclined side face or faces 13, 14 of the parts 10 adjacent to said individual part 10 there is a larger gap between their lower edges than between their upper edges.

Particularly, as seen in FIG. 9, the individual parts 10 are prismatic parts having a quadrangular base, each of which comprises two rectangular side faces 13, 14, two trapezium-shaped side faces 15, 16, a rectangular upper face 11 and a rectangular lower face 12 having a surface smaller than the upper face 11. The trapeziums of the side faces 15 and 16 are right trapeziums when the individual parts 10 are those of the ends, since the non-inclined vertical face is what is attached to the machinable portion 3. The obtuse angle formed by each of the inclined side faces 13, 14 of an individual part 10 with respect to its lower face 12 is preferably comprised between 92° and 96°.

The upper faces 11 of the individual parts 10 are initially flush with and attached to the decorative layer 2 through an adhesive 7 in layer form. Furthermore, even though the individual parts 10 are individual parts in and of themselves, they are arranged next to one another, contact one another through the upper edges of their upper faces 11. The inclined side faces 13 and/or 14 of one individual part 10 face the respective side faces 14 and/or 13 of the adjacent individual parts 10, as seen in FIGS. 4, 9 and 10.

Therefore, in the longitudinal direction of the lining plate 100, between two adjacent individual support parts 10 there is a gap between the lower edges of the inclined side faces 13, 14, whereas the upper edges of said side faces 13, 14 remain in contact with one another.

Figure 10:
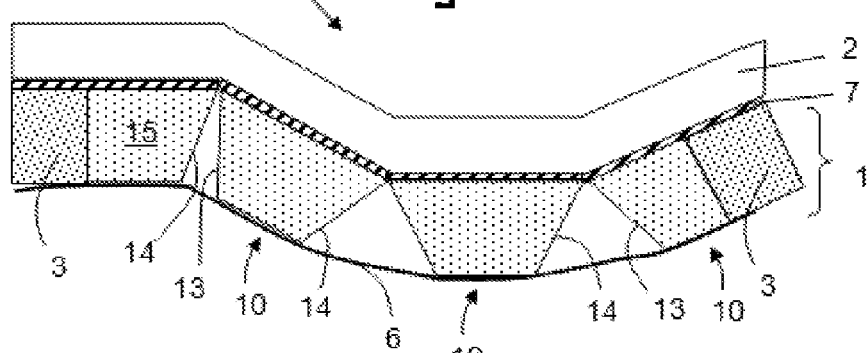
FIG. 10 shows a cross-section view according to a longitudinal section of the plate of FIG. 1 placed on a horizontal surface with irregularities.

The distance between the inclined side face or faces 13, 14 of the individual parts 10 adjacent to one another is precisely what allows the main layer 1 to adapt to the surface of the horizontal support surface to be lined that is not always planar, as shown in FIG. 10, the lower faces 12 of the individual parts 10 moving closer to or away from one another according to the profile of the irregularities that the support surface or the floor 6 may present.

Adapting to the profile of the horizontal support surface to be lined is not a drawback for the upper decorative layer 2 since, due to its vinyl nature, it has certain ductility and bends relatively easily if the morphology of the floor 6 or floor covering so requires. However, this adaptation is not possible in conventional plates in which there is a solid fibrocement layer that is quite thick, for example, greater than 4 mm, due to the rigidity of the material itself, whereby these plates formed by the attachment of a solid layer of a vinyl type with a layer of fibrocement generate stepping instability problems once the horizontal support surface is lined because the layer of fibrocement cannot be supported in its four corners on the support surface, and generally one of the four corners of the plate becomes detached from the surface.

As clearly shown in FIG. 10, the configuration of the main layer 1 of the plate 100 formed by the plurality of individual parts 10 provided with at least one inclined side face 13, 14 allows adapting better to the profile of the horizontal support surface, even though the latter has imperfections or irregularities, since it is assured at all times that the main layer 1 is supported on the horizontal support surface, preventing the stepping instability effect.

Therefore, the fact that it is not necessary to level the support surface in order to line it stands out as an advantage of the lining plate 100 of FIG. 4. Another advantage is that as a result of the overall ductility of the entire plate 100 as a whole, it allows removing one or more plates 100 that have been placed, even though they are located in the center, with relatively little effort. The plate 100 preferably having a rectangular format of 30×60 cm is capable of absorbing an unevenness of 5 mm in a length of 50 mm.

The lining plate 100 can be placed so as to be floating on the horizontal support surface, although it can also be adhered to the surface through a self-adhesive layer adhered to the lower face 12 of the individual parts 10. The adhesive of the self-adhesive layer can comprise ethyl acetate or an ethylene vinyl acetate copolymer, and the self-adhesive layer can be externally covered by a sheet of paper (not depicted in the drawings) that can be peeled off by the user when placing the plates 100 on the floor 6 or floor covering.

Figure 11:
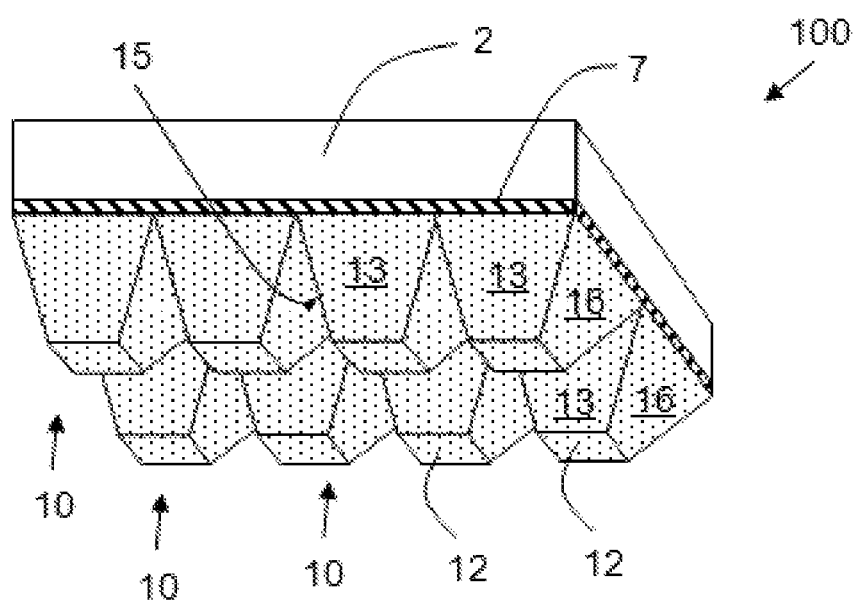
FIG. 11 shows a bottom perspective view of a central portion of a fifth embodiment of the lining plate according to the invention, in which the individual parts of the main layer have an inverted truncated pyramid shape.

FIG. 11 depicts a central portion of another variant of the panel 100 in which the individual parts 10 also have inclined side faces 13, 14, 15, 16, since said individual parts 10, at least those located in the central area of the main layer 1, are inverted truncated pyramid-shaped parts having a square base, so the ability to adapt to the irregularities of the horizontal surface is reinforced in the longitudinal direction and also in the transverse direction. The term inverted is interpreted to mean that the position of the pyramidal body is inverted with respect to the usual position, i.e., the vertex of an inverted pyramid will be in the lower portion and the base in the upper portion. Likewise, a truncated pyramid is interpreted to mean that portion of a pyramid comprised between the base and another plane that sections all the side edges. It should be pointed out that the individual parts 10 of the edges, those attached by one of their faces to a respective machinable portion 3, will have a vertical side face for attachment thereof to said portion.

Figure 12:
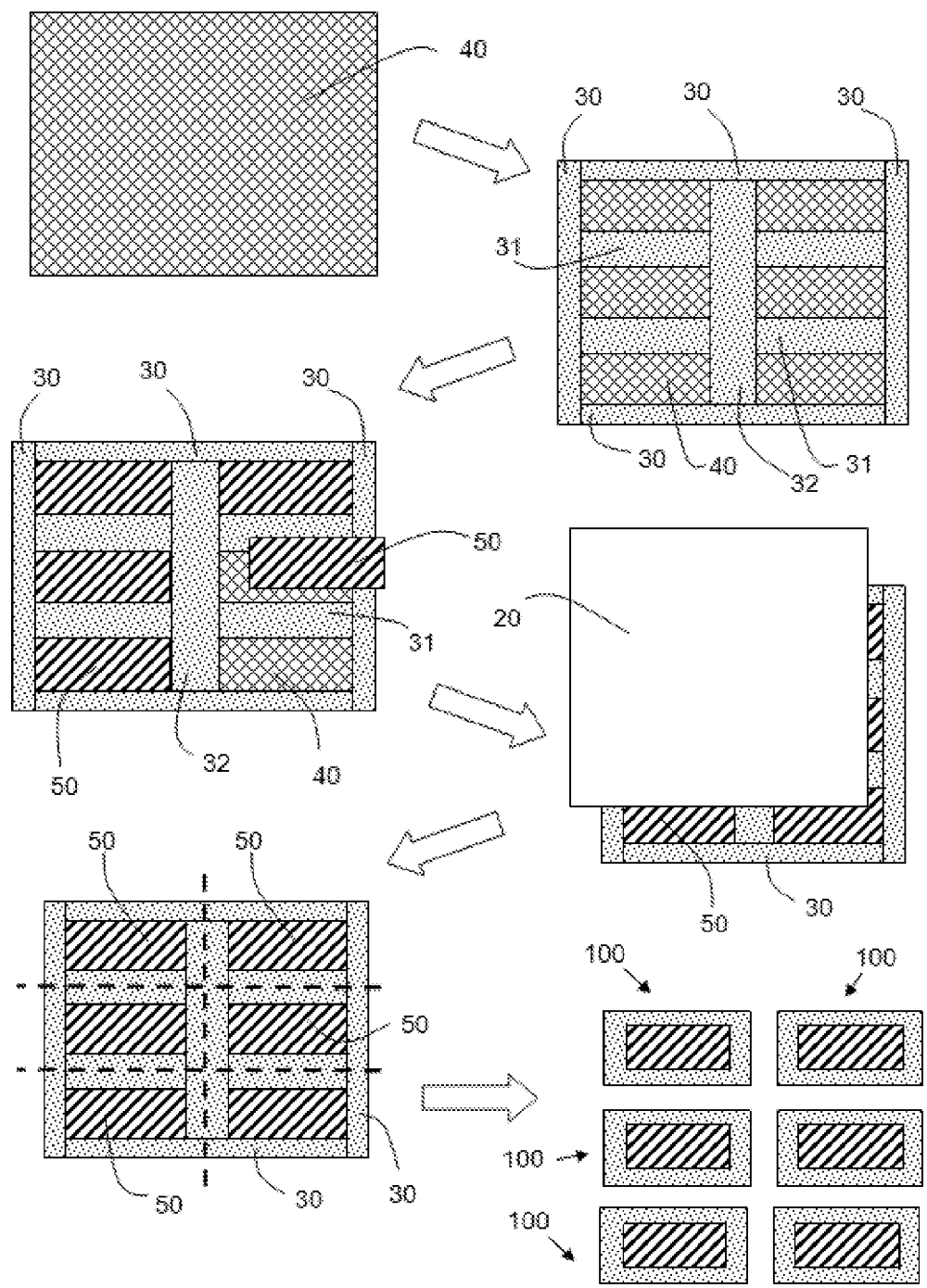
FIG. 12 shows a diagram of different phases of the method of manufacture of the invention for manufacturing a plate such as that of FIG. 1.

The plates 100 described above, particularly the plates of FIGS. 1 to 3, can be efficiently and economically manufactured following the method the phases of which are schematically depicted in FIG. 12 and described below.

A stratum 40 of rectangular-shaped flexible material which will form the support layer 4 is first arranged. Then glue or an adhesive is applied to the upper face of the stratum 40 in order to arrange thereon several strips 30, 31 and 32 made of a ductile machinable material, such as the material forming the machinable portions 3 of the panel 100.

The strips 30 are used to cover the four sides of the perimetral area of the surface, and a series of additional strips 31 parallel to the longest side of the stratum 40 and strip 32 parallel to the shortest side of the stratum 40 are also placed, creating a type of frame or lattice.

In the following phase, a plate 50 made of a rigid or semi-rigid material having the same thickness as the strips 30, 31, 32 is placed such that it takes up each of the spaces existing between the strips 30, 31, 32. The plates 50 are made of the same material as the main layer 1. A stratum 20 of ductile or flexible material, decorated on one face, is then arranged, and glue or an adhesive is applied on the face opposite the decorated face in order to subsequently place this face with glue on the arrangement of strips 30, 31, 32 and plates 50, forming an assembly.

Finally, the assembly formed is divided by making cuts parallel and perpendicular to the longest side of the assembly, as depicted by dashed lines, said cuts vertically coinciding with the longitudinal axis of the additional strips 31 and with the longitudinal axis of the strip 32. Dividing by cutting results in obtaining several lining plates 100, six according to the example of FIG. 12. Of course depending on the number of additional strips 31 and strips 32 perpendicular to the former arranged for forming the frame and on the distance between the strips 31, 32 themselves and with respect to the strips 30 of the perimeter, a larger or smaller number of lining plates 100 will be manufactured.

Figure 13:
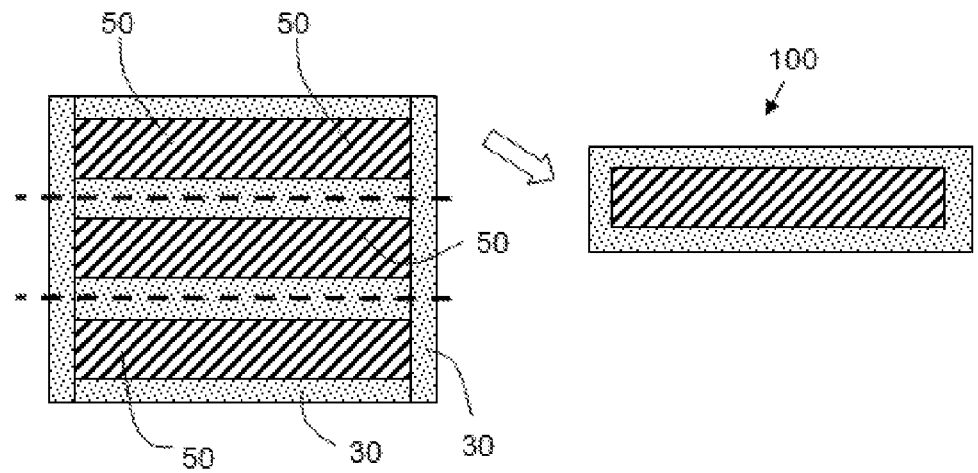
FIG. 13 shows a diagram of the last phase of the method of the invention according to a second variant thereof.
Figure 14:
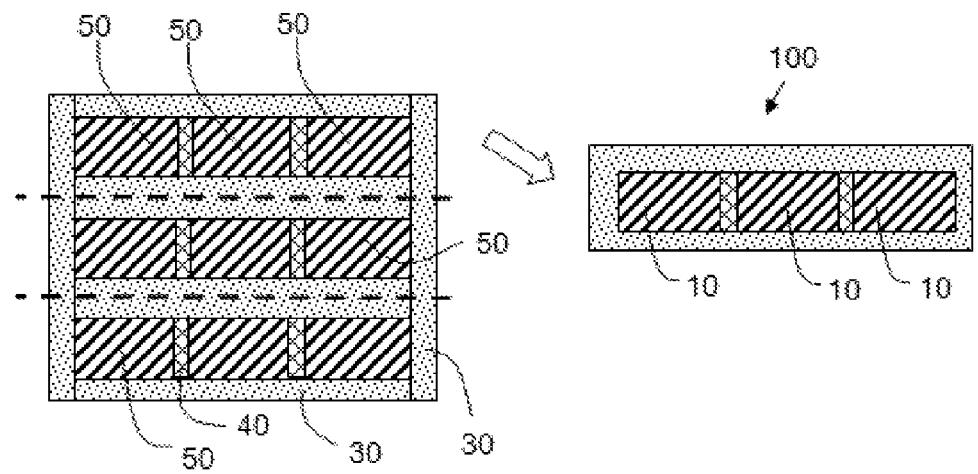
FIG. 14 shows a diagram of the last phase the method of the invention according to a third variant thereof.

FIGS. 13 and 14 show, in summary, similar arrangements of strips 30 and of additional strips 31 parallel to the longest side, with the difference that in this case there is no strip 32 arranged parallel to the shortest side between the two strips 30 located on the two shortest sides. Furthermore, it can be seen in FIG. 14 that between the space created between the strips 30 and 31 there is arranged not one but three plates 50 (FIG. 13) separated from one another by a certain distance, resulting in the manufacture of lining plates 100 of the type shown in FIG. 2, i.e., in which the main layer 1 is formed by several individual parts.

The invention claimed is:

1. A multilayer lining plate for essentially horizontal support surfaces such as floors or floor coverings, comprising a main layer, including at least one part, and a ductile upper decorative layer, wherein the lining plate comprises in the perimeter of the main layer a ductile machinable portion that can be machined to form a connecting profile for connection of the lining plate with other plates;
wherein the at least one part of the main layer is more rigid than the upper decorative layer; and
wherein the at least one part of the main layer is made of magnesium oxide, fibrocement or mortar with perlite and vermiculite.

2. The plate according to claim 1, wherein the machinable portion is made of medium-density fiberboard, a wood-plastic composite material or polyvinyl chloride.

3. The plate according to claim 1, wherein the main layer has a thickness measured in the normal direction with respect to the surface of the decorative layer equal to or greater than 2.5 mm.

4. The plate according to claim 1, wherein the main layer is configured by a plurality of individual parts arranged adjacent to and facing one another by at least one respective side face of the plurality of individual parts.

5. The plate according to claim 4, wherein the individual parts are separated from one another by a strip of compressible or spongy material.

6. The plate according to claim 4, wherein each of the individual parts comprises a planar upper face and a planar lower face parallel to one another and at least one planar side face inclined with respect to the lower face forming an obtuse angle, the individual parts being arranged side by side with their side faces facing one another, such that between the inclined side face or faces of one part and the facing inclined side face or faces of the parts adjacent to said part there is a larger gap between their lower edges than between their upper edges.

7. The plate according to claim 6, wherein the individual parts are prismatic parts having a quadrangular base each of which comprises two rectangular side faces, two trapezium-shaped side faces, a rectangular upper face and a rectangular lower face having a surface smaller than the upper face.

8. The lining plate according to claim 6, wherein the individual support parts are inverted truncated pyramid-shaped parts, the surface of the lower faces being smaller than the surface of the upper faces.

9. The multilayer lining plate according to claim 6, wherein the obtuse angle formed by each of the inclined side faces of a support part with respect to its lower face is comprised between 92° and 96°.

10. The plate according to claim 1, wherein the plate further comprises a continuous support layer arranged below the main layer and that is flexible relative to the at least one part of the main layer.

11. The plate according to claim 10, wherein the support layer is of polyvinyl chloride or a wood-plastic composite material.

12. The plate according to claim 1, wherein the main layer is manufactured by a single part, and wherein the plate further comprises a continuous support layer of high-pressure laminate arranged below the main layer.

13. The plate according to claim 11, wherein the support layer has a thickness equal to or greater than 0.25 mm.

14. The plate according to claim 11, wherein the support layer has a thickness less than or equal to 5 mm.

15. The plate according to claim 11, wherein the support layer has a thickness comprised between 0.3 and 1.5 mm.

16. The plate according to claim 1, wherein the decorative layer is a layer of natural or synthetic plant-based material, mineral-based material, organic material, inorganic material or a mixture thereof.

17. The plate according to claim 1, wherein the decorative layer is a sheet of vinyl material having a thickness comprised between 1 and 10 mm.

18. The plate according to claim 1, wherein the outer face of the machinable portion oriented opposite the main layer is formed as a connecting profile for the connection with other plates.

* * * * *